Sept. 29, 1959  TATUO NOJIRI  2,906,469
CAMERA FILM REWINDING KNOB
Filed May 23, 1956

INVENTOR.
TATUO NOJIRI
BY
ATTORNEY

United States Patent Office 2,906,469
Patented Sept. 29, 1959

2,906,469

CAMERA FILM REWINDING KNOB

Tatuo Nojiri, Todorokimachi, Setagayaku, Tokyo, Japan, assignor to Canon Camera Company, Inc., Otaku, Tokyo, Japan, a corporation of Japan Application May 23, 1956, Serial No. 586,771

Claims priority, application Japan July 1, 1955

2 Claims. (Cl. 242—71.3)

This invention relates to photographic cameras and more particularly to film rewinding knobs for roll film cameras.

An object of this invention is to provide cameras with a film rewinding knob which is flush with the plane of the camera top and is pulled up to project therefrom for rewinding the film after the film has been exposed.

A clearer concept of the scope and purpose of this invention may be obtained from the following description, taken in connection with the attached drawing, in which.

Figure 1:
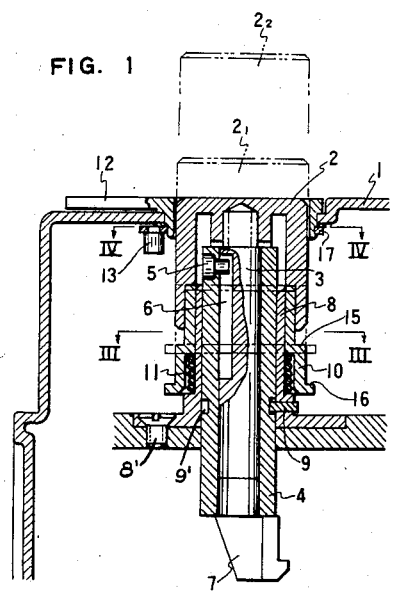
Fig. 1 is a longitudinal sectional view of the film rewinding knob according to this invention.

1 is the top cover of the camera. 2 is the film rewinding knob integrally supported at the top end region of rotatable shaft 3 about which coaxial sleeve 4 is telescopically fitted. Through the upper region of sleeve 4 extends a key or pin 5 engaging the longitudinal groove 6 in shaft 3, the lower end of sleeve 4 being bifurcated to form a fork 7 adapted to engage the film spool. A bearing 8 fixedly mounted in the camera body, as by three set screws 8', supports sleeve 4 so that the sleeve is freely rotatable. To render sleeve 4 axially immobile, the catch 9 engages a circumferential groove 9' at the lower end region of sleeve 4. A thimble 10 is slidably mounted along the bearing 8 and is biased upwardly against knob 2 by release spring 11. 12 is a release lever for the film rewinding knob which lever is supported on the top surface of the top cover 1, the ring 17 having an internal diameter slightly greater than the outer diameter of the knob and is slidably supported against axial displacement by the camera top. 13 is a cam or pin affixed to a ring 17 integral with lever 12. 14 is a spring biased stop lever pivoted about screw 19 and swings clockwise when the pin 13 is moved counter-clockwise by lever 12 and engages one of the two steps 15, 16 of the thimble 10.

Figure 2:
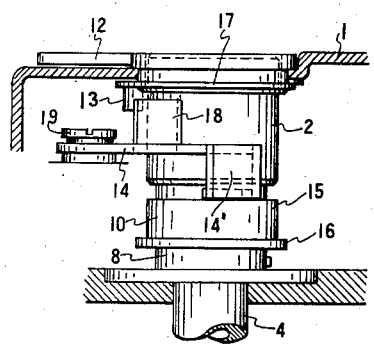
Fig. 2 is a side view.
Figure 3:
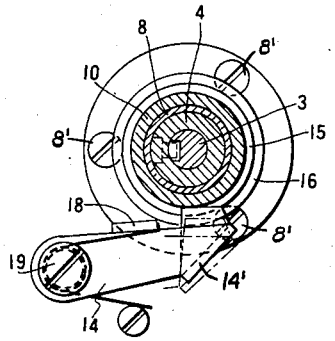
Figs. 3 and 4 are transverse sectional views along lines III—III and IV—IV of Fig. 1 respectively.
Figure 4:
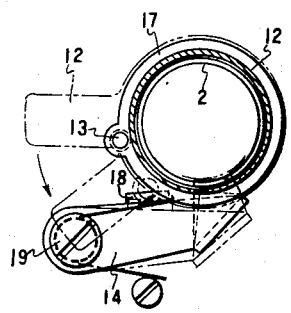

Fig. 1 illustrates the film rewinding knob 2 in its retracted or flush position in which the thimble 10 is positioned, compressing the spring 11 and the stop 14', depending from lever 14, engages with step 15 thus maintaining the knob 2 with its top flush with camera top 1 as shown in Fig. 2. When the lever 12 is turned in the direction of the arrow shown in Fig. 4, the pin 13 moves therewith and pushes a projection 18 of lever 14 against the tension of its biasing spring to swing the stop 14' outwardly around pivot 19 so as to be eventually released from the top surface of thimble 10. Then thimble 10 is pushed upwardly by spring 11 until step 16 engages stop 14' so as to project rewinding knob 2 outside as shown in double dotted chain line 2₁ shown in Fig. 1. When the rewinding knob 2 is pulled out the entire length of the longitudinal groove 6 as shown in double dotted chain line 2₂ in order more facilely to rewind, the sleeve 4 remains at its predetermined position due to catch 9 and circumferential groove 9' while the shaft 3 moves vertically with the rewinding knob 2. When the rewinding operation is completed, the rewinding knob 2 is depressed manually and the annular shoulder on the outer surface of the thimble at a region intermediate the length thereof moves downwardly to be caught by the stop 14' to maintain the film rewinding knob in its flush position shown in Fig. 2. It should be noted that the rewinding knob 2 may be made integral with the thimble 10.

As described above, this invention eliminates the trouble experienced with conventional cameras having the film rewinding knob projecting at all times, since the instant structure is so arranged that the rewinding knob is flush with the camera top while making exposures, and is caused to project only by actuating lever 12 counter-clockwise when desired, and thus to facilitate rotating the knob to rewind the exposed film.

I claim:

1. A film rewinding device for photographic cameras comprising a rotatable vertical shaft within the camera body, a coaxial sleeve about the shaft and rotatable with the shaft, a knob affixed to the upper end region of the shaft, so that the top face of the knob is flush with the top of the camera, a bearing about the sleeve, the lower end of the bearing being affixed to an interior portion of the camera body, a thimble slidable on the bearing, a compression spring braced between the lower ends of the bearing and the thimble biasing the thimble upwardly always to engage the upper end region of the thimble to the lower end region of the knob, a longitudinal groove in the outer surface of the shaft and extending from adjacent the top thereof to a predetermined intermediate region of the shaft, a pin extending through the sleeve and into the groove, a circumferential groove in the sleeve at a region thereof below the predetermined intermediate region of the shaft and the lower end of the bearing, a catch extending through the bearing and into the circumferential groove to prevent axial movement of the sleeve, a spring pressed horizontal lever pivoted to an interior region of the camera body above the lower end of the bearing, an annular shoulder on the outer surface of the thimble at a region intermediate the length thereof, a dependent stop integral with the lever and normally engaging the shoulder, and rotatable means mounted in the camera top about the knob which on rotation in a predetermined direction actuates the lever to disengage the stop from the shoulder to permit the compression spring to elevate the thimble and knob a distance equal to that of the longitudinal groove.

2. A film rewinding device according to claim 1 in which the rotatable means mounted in the camera top about the knob comprises a ring having an internal diameter slightly greater than the outer diameter of the knob, said ring being rotatable and prevented from axial displacement by the camera top, an arm integral with the ring and extending radially from a portion thereof above the camera top, and a pin spaced from the arm and extending downwardly from the portion of the ring below the camera top and of a length to engage the spring pressed horizontal lever, and, on rotation of the arm in one direction, to pivot the spring pressed lever in the direction to disengage the stop from the shoulder.

References Cited in the file of this patent

UNITED STATES PATENTS

| | | |
|---|---|---|
| 2,245,214 | Mihalyi | June 10, 1941 |
| 2,367,892 | Schallis | Jan. 23, 1945 |
| 2,622,819 | Goldhammer | Dec. 23, 1952 |